United States Patent [19]

Chang

[11] 4,217,036
[45] Aug. 12, 1980

[54] ACOUSTIC-OPTIC COHERENT MODULATOR AND DETECTION SYSTEM

[75] Inventor: I-Cheng Chang, Sunnyvale, Calif.

[73] Assignee: Itek Corporation, Lexington, Mass.

[21] Appl. No.: 896,856

[22] Filed: Apr. 17, 1978

[51] Int. Cl.² ............................................. G02F 1/33
[52] U.S. Cl. .............................. 350/358; 331/94.5 M; 350/149
[58] Field of Search ................. 331/94.5 M, 94.5 Q; 350/311, 358, 149

[56] References Cited

U.S. PATENT DOCUMENTS

| 3,632,193 | 1/1972 | Kusters . |
| 3,679,288 | 7/1972 | Harris . |
| 3,701,584 | 10/1972 | Runge . |
| 4,052,121 | 10/1977 | Chang . |

OTHER PUBLICATIONS

Harris et al., Acousto–Optic Tunable Filter, JOSA, vol. 59, No. 6, (Jun. 1969), pp. 744–747.
Chang, Noncollinear Acousto–Optic Filter With Large Angular Aperture, Appl. Phys. Lett., vol. 25, No. 7, (Oct. 1, 1974), pp. 370–372.
Wiczer et al., Influence of Electrostatic Fields on the Properties of Acoustically Tuned Optical Filters, Appl. Phys. Lett., vol. 30, No. 9, (May 1, 1977), pp. 439–441.

*Primary Examiner*—William L. Sikes
*Attorney, Agent, or Firm*—Homer O. Blair; Robert L. Nathans; Gerald H. Glanzman

[57] ABSTRACT

The intensity of light beams transmitted through a tunable acousto-optic modulator is controlled by modulating the center wavelength of the filter passband. Such wavelength modulation can be obtained by modulation of the acoustic frequency or the crystal birefringence. An acousto-optic modulator of this type is sensitive to the temporal coherence of the light beam. When used in an optically coherent detection system, it can provide detection of very weak laser beams in the presence of strong incoherent background radiations.

8 Claims, 5 Drawing Figures

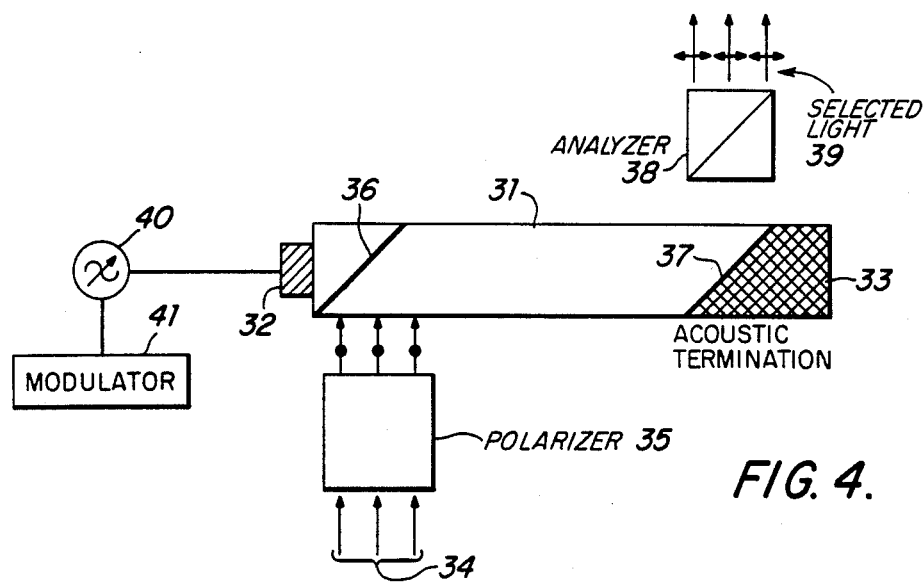
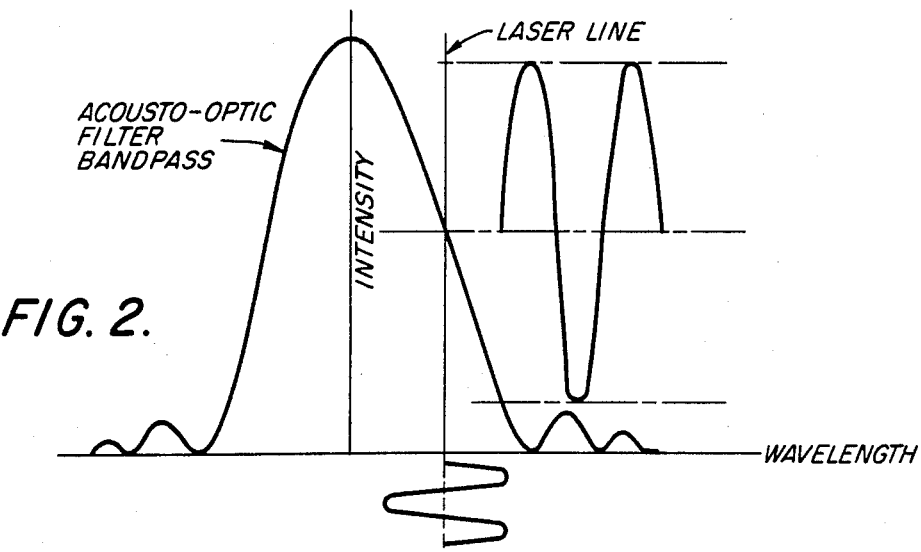
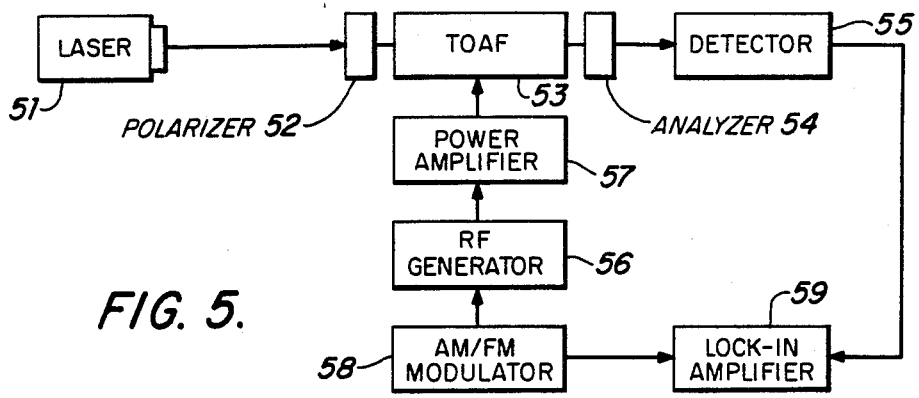

ACOUSTIC-OPTIC COHERENT MODULATOR AND DETECTION SYSTEM

BACKGROUND OF THE INVENTION

Electronically tunable acousto-optic bandpass filters have been constructed so that a cone of light of first polarization is diffracted by an acoustic wave in an anisotropic medium (such as a birefringent crystal) to shift from the first to a second polarization of the light beam at a selected bandpass of optical frequencies. The center wavelength of the passband of the acousto-optic filter is electronically tunable by changing the frequency of the acoustic wave within the crystal.

Two basic types of tunable acousto-optic filters have been constructed: collinear and noncollinear. In the collinear filter, the incident and diffracted light beams inside the birefringent crystal are collinear with the acoustic beam. The diffracted light beam at the selected passband is separated from the incident light beam by crossed polarizers. The collinear type of acousto-optic filter is disclosed in an article entitled "Acousto-Optic Tunable Filters" appearing on pages 744–747 in the June, 1969 issue of The Journal of the Optical Society of America (Vol. 59, No. 6), and in U.S. Pat. No. 3,679,288, entitled "Tunable Acousto-Optic Method and Apparatus."

In the noncollinear filter, the light beams inside the birefringent crystal are noncollinear with the acoustic beam. The diffracted light beam at the passband is selected from the incident light beam by either crossed polarizers or spatial separations. The noncollinear type of acousto-optic filter is disclosed in an article entitled "Noncollinear Acousto-Optic Filter with Large Angular Aperture", appearing on pages 370–372 of the Oct. 15, 1974 issue of the Applied Physics Letters (Vol. 25), and in U.S. Pat. No. 4,052,121, entitled "Non-collinear Tunable Acousto-Optic Filter".

The most significant feature of both the collinear and noncollinear tunable acousto-optic filter is that a narrow filter bandpass can be maintained for a relatively large cone of incident light. This large angular aperture characteristic is due to the proper choice of acousto-optic interaction geometry, wherein the tangents to the locus of the incident and diffracted light wave vectors are parallel. This condition of "parallel tangents" applies to both noncollinear and collinear acousto-optic filters.

For the remainder of this disclosure, "tunable acousto-optic filter" will be defined as an optical filter that operates on the basis of the "parallel tangents" type of acousto-optic diffraction in a anisotropic medium wherein the "parallel tangents" condition is satisfied.

In one kind of collinear acousto-optic filter, the tuning of the passband is accomplished by varying the birefringence of the crystal with the application of a voltage applied to two electrodes placed along the length of the birefringent crystal. This kind of voltage-tuned collinear acousto-optic filter is disclosed in an article entitled "Influence of Electrostatic Fields on the Properties of Acoustically Tuned Optical Filters" appearing on pages 439–441 of the May 1, 1977 issue of Applied Physics Letters (Vol. 30) and in U.S. Pat. No. 3,701,584, entitled "Tuned Voltage Variable Birefringent Acousto-Optic Filter".

The prior art described above is concerned mainly with an acousto-optic apparatus that is useful as an electronically tunable optical filter wherein the tuning of the filter is achieved by changing acoustic frequency or electrically induced birefringence. Such an anisotropic acousto-optic apparatus could also be used in an optical modulator. Since the light transmission through the acousto-optic filter is a function of the power of the acoustic wave, a most direct way to obtain intensity modulation of light is to amplitude-modulate the acoustic wave. This kind of collinear acousto-optic filter used as a light modulator is disclosed in U.S. Pat. No. 3,632,193, entitled "Method and Apparatus for Control of Light Transmission Through an Anisotropic Medium".

It is important to note that the collinear acousto-optic filter used as a light modulator operates equally on light generated from a coherent source (such as the laser) or from an incoherent source (such as a tungsten lamp). However, for some applications it is desirable to employ a laser beam modulator that is insensitive to incoherent light. One such application is the detection of a weak laser beam in the presence of incoherent background radiation such as sunlight.

The primary object of this invention, therefore, is to provide a light modulation method and apparatus that is sensitive to the temporal coherence of the light beam.

SUMMARY OF THE INVENTION

A principal object of the present invention is to provide a light modulation method and apparatus to modulate the intensity of laser beams transmitted through a tunable acousto-optic filter.

One feature of the present invention is to apply a frequency modulated RF signal to the transducer to produce a corresponding intensity modulation of a laser beam through the tunable acousto-optic filter.

Another feature of the present invention is to produce an intensity modulation of a laser beam through the tunable acousto-optic filter by applying an alternating voltage to two electrodes placed on the crystal.

Another feature of the present invention is the same as the preceding features wherein the RF frequency of the acoustic wave is chosen so that the laser light passing through the tunable acousto-optic filter is intensity modulated at either the same frequency or twice the frequency of the modulating signal.

Another feature of the present invention is the same as the preceding features wherein the modulated laser light is detected in phase synchronization with the modulating signal.

Another feature of the present invention is that the modulation is relatively insensitive to incoherent light.

BRIEF DESCRIPTION OF THE DRAWINGS

FIG. 2 shows the operating principle of the acousto-optic coherent modulator of the present invention.

FIG. 4 is a schematic representation of another embodiment of the present invention.

FIG. 5 is a schematic representation of an acousto-optic coherent detection system.

DESCRIPTION OF THE PREFERRED EMBODIMENTS

Figure 1:
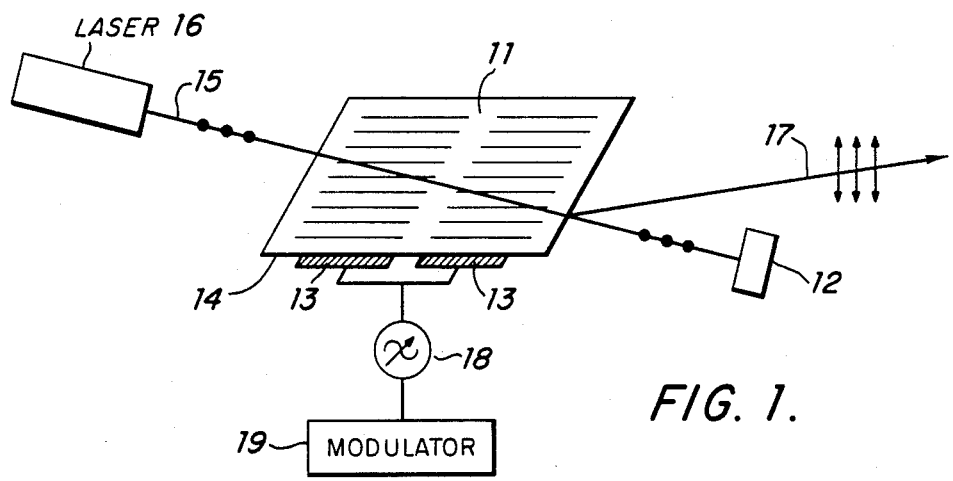
FIG. 1 is a schematic representation of an acousto-optic coherent modulator illustrating one embodiment of the present invention.

A schematic of the acousto-optic coherent modulator according to one embodiment of the present invention utilizing a noncollinear acousto-optic filter configuration is shown in FIG. 1. The modulator consists of a birefringent crystal 11, a stop 12, and one or more piezoelectric transducers 13 mounted in intimate contact with the crystal 11, on a predetermined surface 14. A polarized light beam 15 from a laser 16 passes through the crystal 11 and is diffracted by the acoustic beam launched from the transducers 13. The field stop 12 is used for a spatial filtering purpose so that only the diffracted beam is allowed to transmit as the output beam 17. The transducer 13 is connected to a suitable tunable RF generator 18 that serves to excite acoustic waves. The frequency and the direction of the acoustic wave are chosen so that the laser beam of specific wavelength incident within a relatively large angular aperture can be efficiently diffracted. An FM modulator 19 is connected to the RF generator to produce a frequency modulated acoustic wave. As a result of the frequency modulation, an intensity modulation of the output beam 17 occurs. This is explained in the following paragraphs:

The transmission T of a tunable acousto-optic filter at the optic wavelength $\lambda$ is given by $$T = T_0 \, \text{sinc}^2 \, 1/a \, (\lambda - \lambda_c) \tag{1}$$

where $T_0$ is the peak transmission, sinc $(x) = \sin(\pi x)/(\pi x)$, the parameter a is equal to the 4 dB bandwidth of the filter, and $\lambda_c$ is the center wavelength of the filter passband. The peak transmission $T_0$ varies as a function of acoustic power $$T_0 = \sin^2(KP_a^{\frac{1}{2}}) \tag{2}$$

where $P_a$ is the acoustic power in the medium and K is a proportional constant depending on the geometric factors and properties of the filter crystal.

The center wavelength of the tunable acousto-optic filter is related to the frequency of the acoustic waves according to the tuning relation $$\lambda_c = (V_a \Delta n / f_a) F \tag{3}$$

where $\Delta n$ is the birefringence of the filter medium, $V_a$ is the acoustic velocity, $f_a$ is the acoustic frequency and F is a proportional constant depending on the light incidence angle.

Consider the transmission of a laser beam through the tunable acousto-optic filter: Equation (2) shows that the intensity of the laser beam can be modulated by varying the amplitude of the acoustic carrier. This type of modulation shall be referred to as direct (amplitude) modulation. A different situation occurs when the frequency of the acoustic carrier is varied. Equation (3) shows that the center wavelength of the filter passband is modulated accordingly. For small frequency deviations, the center wavelength of the passband then varies in the following manner:

$$\lambda_c(t) = \lambda_0 + a\delta \cos \omega_m t \tag{4}$$

where $\omega_m$ is the angular frequency of the modulating signal and $\delta$ is the magnitude of the wavelength deviation (measured in units of filter bandwidth a).

When $\lambda_c(t)$ is substituted in equation (1), the result is a transmission which varies periodically in time, as shown in FIG. 2. This modulation of the light intensity transmitted through the tunable acousto-optic filter shall be referred to as wavelength modulation. The periodic variation of the transmission T can be decomposed into Fourier components at harmonics of the modulating frequency $\omega_m$. With proper choice of $\lambda_0$, the light modulation appears as a sinusoidal function of time with a frequency that is either equal to $\omega_m$ (fundamental component) or $2\omega_m$ (second harmonic). For example, FIG. 2 shows the case of modulation at $\omega_m$. On the other hand, modulation at $2\omega_m$ is obtained when the center wavelength of the filter is chosen to coincide with the laser wavelength ($\lambda_0 = \lambda_L$).

The wavelength modulation method described here is relatively insensitive to broadband incoherent light (e.g., sunlight). The broadband incoherent light appears to be of constant intensity within the narrow passband of the tunable acousto-optic filter. Thus, a "jittering" of the filter passband will produce essentially negligible modulation on the transmitted light. More detailed analysis shows that the magnitudes of the Fourier components of the modulated light are proportional to the wavelength derivatives of the light spectrum. For broadband incoherent light such as sunlight, these derivatives are very small. As an example, consider the effect of wavelength modulation on sunlight transmitted through a tunable acousto-optic filter. It is assumed that sunlight can be regarded as a radiation from a blackbody radiation of 6000° K. The intensity of the Fourier component of the modulated light at $\lambda_c = 0.633$ $\mu$m can be shown to be $I_1/I_0 \approx 1.2(a\delta)$, $I_2/I_0 \approx 0.05(a\delta)^2$ where $I_0$, $I_1$ and $I_2$ are the Fourier components at 0, $\omega_m$ and $2\omega_m$ respectively. If $a = 5$ Å $= 5(10^{-4})$ $\mu$m, $\delta = 0.25$, it follows $I_1/I_0 \approx 1.5(10^{-4})$, $I_2/I_0 = 7.8(10^{-10})$. Thus, for modulating sunlight, the efficiency for fundamental and second harmonic wavelength modulation is about 38 and 91 dB below that of direct modulation.

Figure 3:
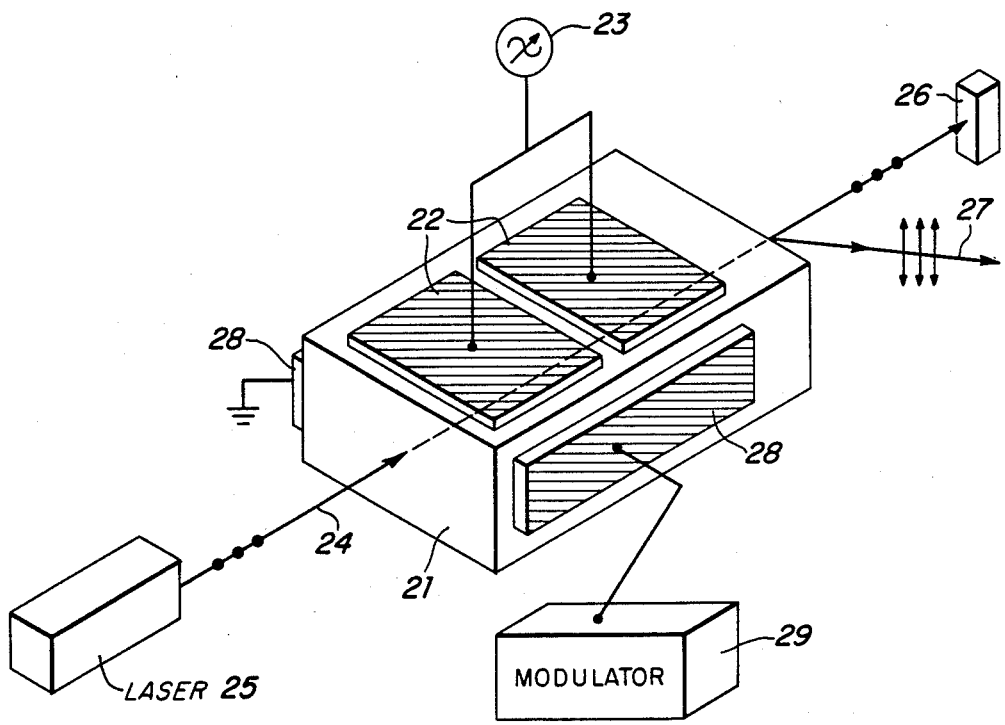
FIG. 3 is a schematic representation of an alternative embodiment of the present invention.

A different arrangement of such an acousto-optic coherent modulator can be made. From equation (3) it is seen that the wavelength modulation (equation 4) can also be realized by modulating the birefringence of the acousto-optic filter crystal. Such birefringence modulation can be induced by either modulation of strain or electric fields in the crystal. Referring to FIG. 3, an alternative configuration of an acousto-optic coherent modulator is shown diagrammatically. The modulator consists of a birefringent crystal 21 that is also electro-optic (e.g., LiNbO$_3$), and one or more transducers 22 that are mounted in intimate contact with the crystal 21, and are driven by a tunable RF generator 23. A polarized light beam 24 from a laser source 25 is incident on the crystal 21 and is diffracted by the acoustic beam launched from the transducers 22. A field stop 26 is used so that only the diffracted beam is allowed to be transmitted as the output beam 27. An ac voltage signal from a modulator 29 is applied to the two electrodes 28 placed on the birefringent crystal 21. The ac voltage signal sets up a transverse electric field inside the crystal. By means of an electro-optic effect, the birefringence of the crystal is then modulated at the frequency of the ac voltage signal. Thus, wavelength modulation is produced by birefringence modulation rather than the frequency modulation of the acoustic waves. One advantage of this arrangement over the previous one is that the modulation rate is no longer limited by the transit time of the acoustic waves across the optical aperture.

Other preferred embodiments of the acousto-optic coherent modulator incorporate various forms of collinear tunable acousto-optic filters. One such arrangement is shown in FIG. 4. The modulator consists of a birefringent crystal 31 and a piezo-electric transducer 32 bonded to the crystal 31. An acoustic wave generated at the transducer 32 is launched into the birefringent crystal 31 and is absorbed at the acoustic termination 33. An incident laser beam 34 passes through the input polarizer 35, enters the birefringent crystal 31, is reflected by an internal mirror 36, propagates and interacts collinearly with the acoustic beam, and is again reflected by the second internal mirror 37. As a result of the collinear interaction, the light beam is diffracted into orthogonal polarization, and passes through the analyzer 38 as the selected output beam 39. Wavelength modulation of the laser beam is obtained as the frequency of the RF signal produced at the RF generator 40 and is modulated by the FM modulator 41.

Wavelength modulation using the tunable acousto-optic filter described above can be used in an optical coherent detection system as shown in FIG. 5. Light beam from a laser 51 to be detected is incident from a distribution of directions, passes through the input polarizer 52, is transmitted through the tunable acousto-optic filter 53 and the output analyzer 54 and is received by the detector 55. A RF signal produced by the generator 56 is fed to the power amplifier 57 and then provides the drive power to the transducer. The frequency of the RF signal is modulated by the FM modulator 58. To provide coherent detection, the output of the photo-detector 55 is locked to the modulating signal from the FM modulator 58 using a lock-in amplifier 59. Phase-sensitive detection is obtained at either the fundamental or the second harmonic component of the modulating signal. By proper choice of the post-integration time, a very weak laser signal can be detected in the presence of strong incoherent background radiation.

Some experimental work was done on the acousto-optic coherent modulator and detection system. The experimental setup was the same as that shown in FIG. 5. The tunable acousto-optic filter used in the experiment was a noncollinear $TeO_2$ filter with a tuning range of 450 to 700 nanometers. The spectral bandpass of the filter was about 3 nanometers at 633 nanometers, and the angular aperture was about 14 degrees. An attenuated laser beam from a 633 nanometer He-Ne laser was to be detected in the presence of an incoherent tungsten lamp light. Using one second post integration time, an attenuated laser beam of $5(10^{-7})$ milliwatt was detectable in the presence of incoherent tungsten lamp light. The total intensity of the tungsten lamp light was about 0.1 w/cm$^2$ over the response range of the detector. This intensity is comparable to solar radiance over the same spectral range.

In the following claims the term "tunable acousto-optic filter" is used to include both the collinear and the noncollinear types.

While what has been described constitutes the presently most preferred embodiment of the invention, it should be understood that the invention may take other forms and, accordingly, the invention should be limited only insofar as required by the scope of the following claims.

I claim:
1. A method for modulating the intensity of a cone of light comprising:
   a. passing light of a first polarization into an optical birefringent crystal;
   b. producing an acoustic wave in said crystal;
   c. selecting the direction and frequency of the acoustic wave to diffract the light from said first polarization into a second polarization for a band of optical frequencies and a distribution of incident light directions; and
   d. modulating the intensity of the light diffracted from the first polarization to the second polarization as a periodic function of time with an intensity that is sensitive to the temporal coherence of the incident light.

2. The method recited in claim 1 wherein the step of modulating the intensity of the diffracted light comprises the step of modulating the said selected frequency of the acoustic wave as a recurring function of time.

3. The method as recited in claim 1 wherein the step of modulating the intensity of the diffracted light comprises the step of applying an alternating voltage signal to electrodes placed on said birefringent crystal as a recurring function of time.

4. An acousto-optic coherent modulator for modulating the intensity of a cone of light comprising:
   a. means for passing light of a first polarization into an optical birefringent crystal;
   b. means for producing an acoustic wave in said crystal;
   c. means for propagating the said acoustic wave with selected direction and frequency; and
   d. means for modulating the intensity of the light diffracted from said first polarization to a second polarization as a periodic function of time with an intensity that is sensitive to the temporal coherence of the incident light.

5. Apparatus as recited in claim 4 wherein said means for modulating the intensity of the diffracted light comprises means for modulating the said selected frequency of the acoustic wave as a recurring function of time.

6. Apparatus as recited in claim 4 wherein said means for modulating the intensity of the diffracted light comprises means for applying an alternating voltage signal to electrodes placed on the said birefringent crystal as a recurring function of time.

7. Apparatus as recited in claim 4 wherein said means for passing light into said crystal comprises means for directing laser light into said crystal.

8. An optical detection system for detecting laser light comprising:
A. an acousto-optic coherent modulator, said modulator comprising:
   a. an optical birefringent crystal;
   b. means for passing a laser beam of a first polarization into said crystal;
   c. means for producing an acoustic wave in said crystal;
   d. means for propagating said acoustic wave with selected direction and frequency; and
   e. means for modulating the intensity of the laser beam diffracted from said first polarization to a second polarization as a periodic function of time with an intensity that is sensitive to the temporal coherence of the incident laser beam, said means for modulating the intensity of the diffracted laser beam comprising means for modulating said selected frequency of the acoustic wave as a recurring function of time,
B. means for detecting the modulated laser beam, and
C. means for phase locking the output of said detector means to the modulating signal from said frequency modulating means for detecting and integrating in time the fundamental or second harmonic component of the modulated laser beam.

* * * * *